(12) United States Patent
Oxford

(10) Patent No.: US 6,485,241 B1
(45) Date of Patent: Nov. 26, 2002

(54) SURFACE MOUNT RING ASSEMBLY FOR LOUDSPEAKER

(76) Inventor: J. Craig Oxford, 1211 Belle Mead Blvd., Nashville, TN (US) 37205

(*) Notice: Subject to any disclaimer, the term of this patent is extended or adjusted under 35 U.S.C. 154(b) by 0 days.

(21) Appl. No.: 08/872,239

(22) Filed: Jun. 10, 1997

Related U.S. Application Data

(63) Continuation-in-part of application No. 08/581,009, filed on Jan. 3, 1996, now Pat. No. 5,636,955.

(51) Int. Cl.$^7$ ................................................ H05K 7/14
(52) U.S. Cl. ........................ 411/339; 16/2.1; 181/150
(58) Field of Search ................................ 411/338, 339; 16/2.1; 181/150, 199; 267/141.4; 248/635; 296/35.1; 384/222; 403/228

(56) References Cited

U.S. PATENT DOCUMENTS

| | | | | |
|---|---|---|---|---|
| 722,061 A | * | 3/1903 | Waldo, Jr. | 411/339 |
| 1,485,571 A | * | 3/1924 | Stevens | 411/339 X |
| 2,115,653 A | * | 4/1938 | Snyder | 248/635 |
| 2,273,491 A | * | 2/1942 | Leedy | 248/635 |
| 2,308,965 A | * | 1/1943 | Riesing | 384/220 |
| 2,367,832 A | * | 1/1945 | Riesing | 403/163 |
| 2,520,757 A | * | 8/1950 | Cain | 248/632 |
| 2,583,719 A | * | 1/1952 | White | 16/2.1 |
| 2,774,620 A | * | 12/1956 | Thiry et al. | 403/228 |
| 2,828,095 A | * | 3/1958 | Beck et al. | 248/612 |
| 2,893,722 A | * | 7/1959 | Beck | 267/153 |
| 2,962,312 A | * | 11/1960 | Wanner | 464/30 |
| 2,993,715 A | * | 7/1961 | Hutton | 403/224 |
| 3,013,643 A | * | 12/1961 | Perry | 403/224 |
| 3,016,562 A | * | 1/1962 | Reid | 16/2.1 |
| 3,096,106 A | * | 7/1963 | Wanner | 403/197 |
| 3,112,950 A | * | 12/1963 | Jaskowiak | 296/35.1 |
| 3,128,999 A | * | 4/1964 | Schmitt | 267/153 |
| 3,304,043 A | * | 2/1967 | Beck | 267/140.5 |
| 3,350,042 A | * | 10/1967 | Stewart et al. | 267/141.4 |
| 3,479,081 A | * | 11/1969 | Schaaf | 296/35.1 |
| 3,532,319 A | * | 10/1970 | Brown | 267/141.4 |
| 3,675,881 A | * | 7/1972 | Caldwell | 267/141.4 |
| 3,678,535 A | * | 7/1972 | Charles | 411/339 X |
| 3,895,408 A | * | 7/1975 | Leingang | 16/2.1 |
| 4,062,637 A | * | 12/1977 | Allison | 403/151 |
| 4,067,531 A | * | 1/1978 | Sikula | 220/378 |
| 4,076,195 A | * | 2/1978 | Uhler | 248/575 |
| 4,295,691 A | * | 10/1981 | Rubenthaler | 384/297 |
| 4,306,708 A | * | 12/1981 | Gassaway et al. | 267/141.3 |
| 4,358,098 A | * | 11/1982 | Ceseri | 267/141.5 |
| 4,416,446 A | * | 11/1983 | Murakami | 267/140.3 |
| 4,521,004 A | * | 6/1985 | Caldwell | 267/141.4 |
| 4,522,378 A | * | 6/1985 | Nelson | 267/141.4 |
| 4,732,519 A | * | 3/1988 | Wagner | 411/337 |
| 4,921,371 A | * | 5/1990 | Boiraeu et al. | 403/408.1 |
| 4,975,008 A | * | 12/1990 | Wagner | 411/337 |
| 5,110,081 A | * | 5/1992 | Lang, Jr. | 248/635 |
| 5,139,361 A | * | 8/1992 | Camuffo | 403/408.1 |
| 5,189,779 A | * | 3/1993 | Fishel et al. | 16/2.1 X |
| 5,277,554 A | * | 1/1994 | Elson | 417/363 |
| 5,335,893 A | * | 8/1994 | Opp | 248/635 |
| 5,397,206 A | * | 3/1995 | Sihon | 411/544 |
| 5,551,826 A | * | 9/1996 | Todd et al. | 414/685 |
| 5,577,854 A | * | 11/1996 | Jacob et al. | 403/2 |
| 5,609,329 A | * | 3/1997 | Scholl | 267/141 |
| 5,651,535 A | * | 7/1997 | David | 267/140.5 |
| 5,659,924 A | * | 8/1997 | Gildersleeve | 16/2.1 |

(List continued on next page.)

Primary Examiner—Robert G. Santos
(74) Attorney, Agent, or Firm—Samuels, Gauthier & Stevens

(57) ABSTRACT

A surface mount ring assembly for loudspeakers which comprises a 'hard' ring in which the speaker is secured. This hard ring is, in turn, secured to a resilient or 'soft' ring which soft ring is secured in the wall opening. The soft ring has a durometer of between 30 to 90 and a dynamic loss modulus of $10^{10}$ Dynes/cm$^2$ at 100 to 1000 Hz. This effectively isolates the loudspeaker from the resonant frequency of the structure in which the speaker is secured.

10 Claims, 3 Drawing Sheets

U.S. PATENT DOCUMENTS 5,683,215 A * 11/1997 Gaignard et al. ............. 411/34
5,765,819 A * 6/1998 Hummel ..................... 267/153
5,806,139 A * 9/1998 Anderson et al. ............. 16/2.1
5,871,319 A * 2/1999 Schneider ................... 411/107
6,059,503 A * 5/2000 Johnson ...................... 411/353
6,099,190 A * 8/2000 Honobe et al. ............... 401/13
6,280,132 B1 * 8/2001 Szuczukowski et al. .... 411/353

* cited by examiner

SURFACE MOUNT RING ASSEMBLY FOR LOUDSPEAKER

CROSS-REFERENCE TO RELATED APPLICATIONS

This is a continuation-in-part of application Ser. No. 08/581,009 filed on Jan. 3, 1996 Now U.S. Pat. No. 5,636,955.

FIELD OF THE INVENTION

A mounting ring for a loudspeaker. The ring is frictionally fitted into a panel such as a wall or the interior panel of a vehicle. The loudspeaker is secured in the ring.

BACKGROUND AND BRIEF SUMMARY OF THE INVENTION

In architectural loudspeaker installations loudspeaker drivers are installed into the interior and inside walls of buildings. The existing practice involves the use of a sub-assembly baffle to which one or more drivers are mounted. The baffle is then attached to the wall by means of assembly to a rough-in box which has been placed inside the wall. The rough-in box is a structural frame which requires an opening in the wall approximating the size of the baffle subassembly.

In the installation of loudspeakers in vehicles particularly in the aftermarket, holes are formed in the panels and a support structure is secured in the hole by fasteners, typically threaded fasteners. The loudspeaker is then secured to the support structure, again usually by threaded fasteners. This method of installation is time consuming and costly.

A vibration (resonant frequency) in the form of very low amplitude, omni-directional motion is naturally present in any building or vehicle. This frequency is present at varying levels from as low as 1 Hz up to 1000 Hz. When speakers are hard mounted into a wall or panel, these frequencies migrate to the speaker walls and interfere with the audio design frequencies of the speaker.

The present invention provides a significant improvement to the installation of either architectural or vehicular speakers by eliminating the rough-in box. An opening only the size needed to fit the ring is required. The elimination of the rough-in box greatly reduces installation time and labor. Additional benefits are a smaller (minimal) footprint for a cleaner look. The ring can also provide for integral attachment of the grill. The present invention isolates the speaker from the resonant frequency of the wall or panel in which it is mounted.

In installing a loudspeaker in the panel of a vehicle, a circular hole of the proper circumference is cut into the door panel forming a circular opening. The wires for the speaker can be 'fished' in the usual way, such as using a snake. The ring or speaker is inserted in the door panel. After the rings have been secured, the speaker is secured in the ring.

The present invention comprises a surface mount ring assembly for loudspeakers. The ring is received and secured in an opening solely by frictional engagement. The loudspeaker is received and secured in the ring solely by frictional engagement. The opening can be in any flat surface, wall, vehicular door panel etc. The ring isolates the speaker from the inherent resonance frequency in the structure in which the speaker is mounted.

Broadly the invention embodies a mounting ring assembly for speakers. The ring assembly comprises a 'hard' sleeve or ring in which the speaker is secured. This ring could be any suitable material, metal, polymeric material or the like. This sleeve in turn is secured to a resilient or 'soft' ring which ring is secured in the wall opening. The ring may either be a ring such as described in my parent application as the 'inner ring' or a sleeve-like ring. Either the inner or outer surfaces of the ring are roughened, preferably both surfaces, to enhance both the frictional engagement of the ring in the wall opening and to the sleeve which secures the speaker. Also, the composition of the ring per se has inherent 'adhesive' characteristics to further enhance the engagement of the components one to the other.

The speaker, generally comprises a sleeve having a back end and a front end. When assembled, the speaker/ring/sleeve and/or grill form an integrally mounted assembly with the following characteristics, the speaker is firmly mounted to a 'wall', the speaker is isolated from the inherent resonance in the wall by the ring. The 'soft' ring has a durometer of between 30 to 90 and a dynamic loss modulus of about $10^{10}$ Dynes/cm$^2$ at 100 to 1000 Hz. The 'hard' sleeve can have a stiffness similar to polyvinyl chloride pipe or conduits. This ensures compression among the sleeve/ring/wall acts essentially only on the ring.

DESCRIPTION OF THE PREFERRED EMBODIMENT(S)

Figure 1:
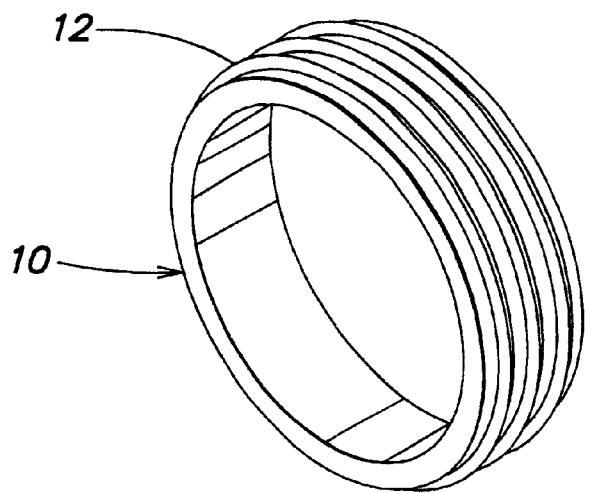
FIG. 1 is a perspective view of a ring of the invention.

Referring to FIG. 1, a ring is shown at 10 and comprises a roughened outer surface characterized by ribs 12.

Figure 2:
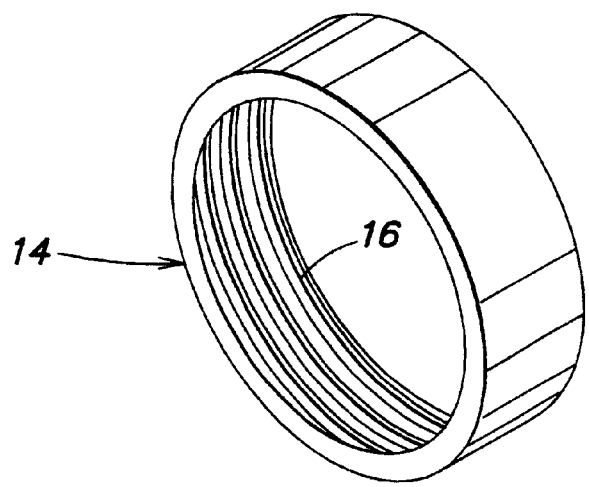
FIG. 2 is a perspective view of an alternative ring of the invention.

Referring to FIG. 2, a ring 14 has a roughened inner surface characterized by ribs 16.

Preferably the rings 10 and 14 are formed of an elastomeric material, a visco elastic elastomer, i.e. butyl rubber, having a durometer of between 30 to 90, preferably between 40 to 50, and a dynamic loss modulus of about $10^{10}$ Dynes/cm$^2$ at 100 to 1000 Hz. The selection of the material results in the ability of the ring to reduce transmission of vibrations from the loudspeaker to the panel by providing isolation and damping. Also, the loudspeaker is isolated from the vibrations inherent in the structure in which it is secured, whether a wall panel or door panel.

Figure 3:
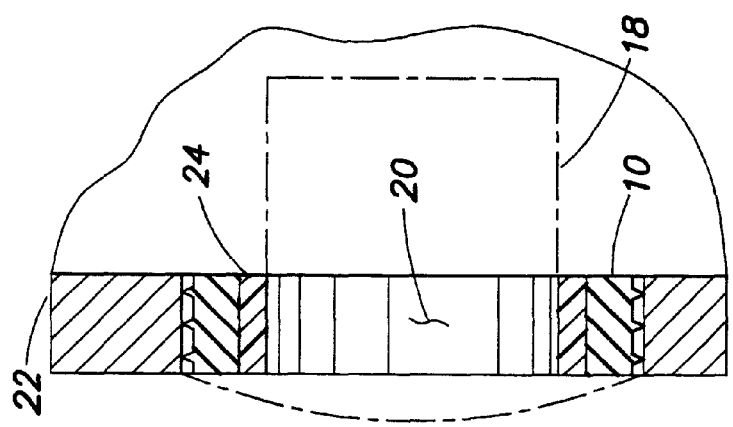
FIG. 3 is a side view of an embodiment of the invention.

Referring to FIG. 3, a speaker 18 is shown in dotted lines. The ring 10 is secured in an opening 20 in a wall 22. A hard sleeve 24, e.g. a PVC tube, compression fits into the ring 10 fixedly securing the ring/sleeve into the wall. The ring 10 damps or isolates the speaker from the resonant frequency of the wall.

Figure 4:
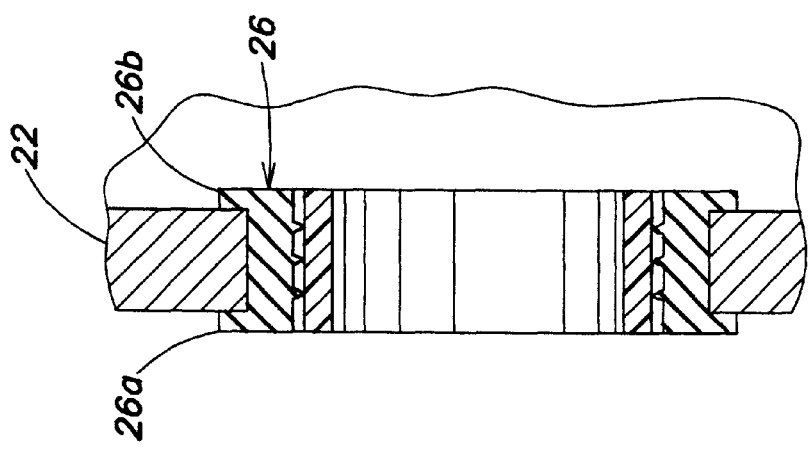
FIG. 4 is a side view of an alternative embodiment of FIG. 3.

Referring to FIG. 4, a ring 26 includes flanges 26a and 26b which abut opposed surfaces of the wall 22 to enhance securing of the ring 26 to the wall 22.

Figure 5:
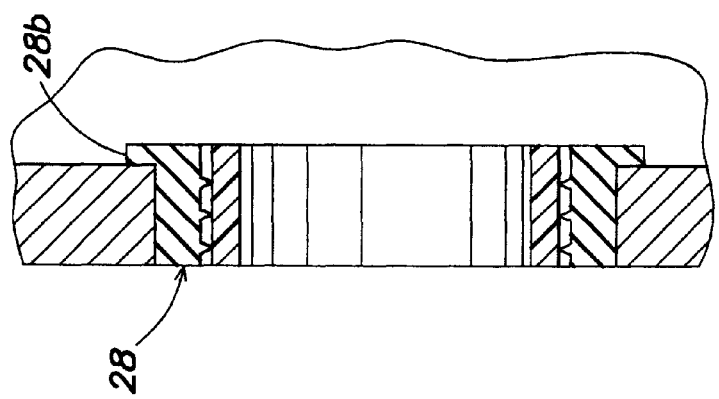
FIG. 5 is a side view of a further alternative embodiment of FIG. 3.

Referring to FIG. 5, a ring 28 is characterized by only one flange 28b.

Figure 6:
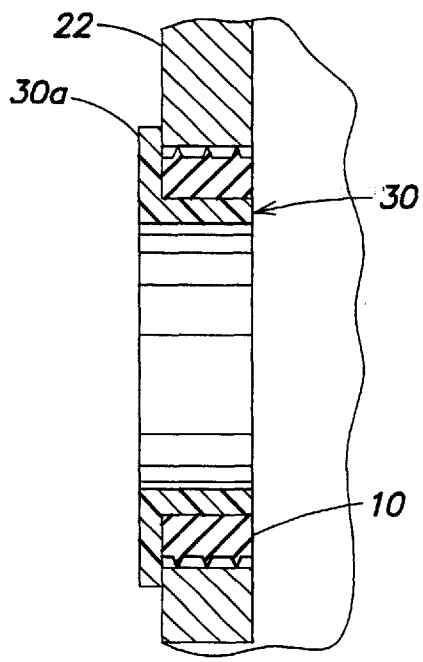
FIG. 6 is a side view of an alternative embodiment of the invention wherein the sleeve is characterized by a flange at the open end thereof.

Referring to FIG. 6, in an alternative embodiment of the invention, a sleeve 30 is flanged at 30a and is used in combination with the ring 10.

Figure 7:
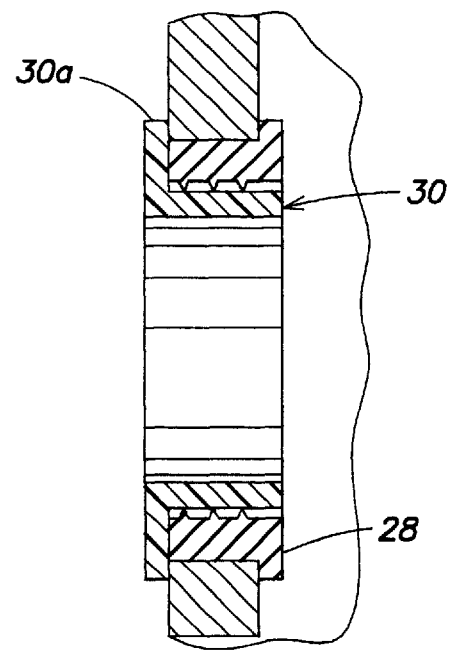
FIG. 7 is a side view of an alternative embodiment of FIG. 6.

Referring to FIG. 7, the ring 28, as shown in FIG. 5, is used with the sleeve 30 of FIG. 6.

Figure 8:
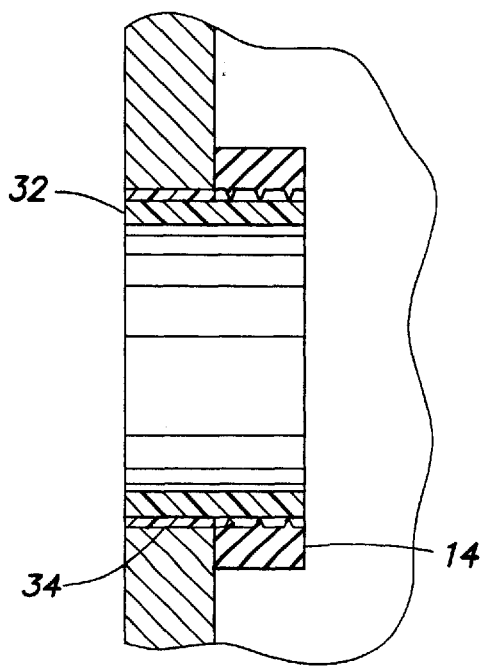
FIG. 8 is a side view of a still further alternative embodiment using the ring of FIG. 2.

Referring to FIG. 8, in another alternative embodiment of the invention, a sleeve 32 extends through the wall 22 and the ring 14 of FIG. 2 compression fits and secures the sleeve 32. A band of ring-like material 34 is secured between the sleeve 32 and wall 22 for damping. In lieu of the band 34, the ring 10 can be used in combination with the ring 14.

Figure 9:
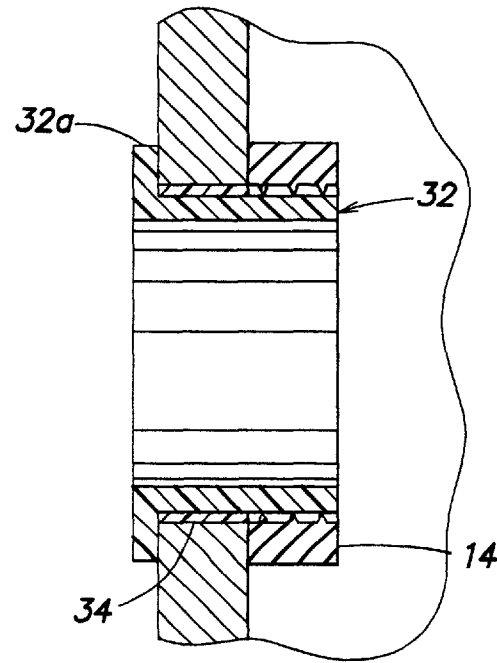
FIG. 9 is a side view of an alternative embodiment of FIG. 8.

Referring to FIG. 9, in an alternative embodiment of FIG. 8, the sleeve 32 is flanged at 32a and abuts the wall 22.

The sleeves 24, 30, 32 have been shown as having smooth surfaces. This is because for the hard sleeve, manufacture is facilitated by extruding or molding with the smooth surfaces. However, it is to be understood that if desired the surfaces of the sleeve, either or both could be roughened, as described for the surfaces of the ring, to enhance the engagement of the parts one to the other.

The insertion of a speaker into the sleeve has been based on frictional engagement between a sleeve of the speaker and the sleeve as described. Obviously commercially available speakers assume various configurations and the speaker could also be secured to the sleeve such as by fasteners or adhesively or any combination of the foregoing.

The roughened surfaces of the rings have been described with reference to a rib-like structure. Any array of grooves, crenelations, striations, protrubences, either uniform or non-uniform, and either uniformly or non-uniformly formed on the surfaces are within the scope of the invention.

The foregoing description has been limited to a specific embodiment of the invention. It will be apparent, however, that variations and modifications can be made to the invention, with the attainment of some or all of the advantages of the invention. Therefore, it is the object of the appended claims to cover all such variations and modifications as come within the true spirit and scope of the invention.

Having described my invention, what I now claim is:

1. A surface mount ring assembly which comprises:

a resilient damping ring having an inner and an outer surface, the outer surface configured to engage an opening in a wall;

a hard sleeve configured to be compression fitted to the inner surface of the ring; and a loudspeaker, such that when the ring is secured in an opening in a wall and the sleeve is secured to the ring the speaker can be secured to the sleeve and thereby in the wall.

2. The assembly of claim 1 wherein the ring has a rear edge characterized by a flange which flange is adapted to engage the opposed surface of the wall into which the ring is engaged.

3. The assembly of claim 1 wherein the ring has front and rear edges, each edge is characterized by a flange which flange is adapted to engage the opposed surface of the wall in which the ring is engaged.

4. The assembly of claim 1 wherein the sleeve has a front edge characterized by a flange, which flange is adapted to engage the opposed surface of the wall in which the ring is engaged.

5. The assembly of claim 4 wherein the ring has a rear edge characterized by a flange which flange is adapted to engage the opposed surface of the wall in which the ring is secured.

6. The assembly of claim 1 wherein the sleeve passes into and through the ring and a portion of the sleeve is adapted to extend beyond the wall and which comprises:

a second ring compression fitted onto the portion of the sleeve which extends beyond the wall and which first ring is adapted to abut the opposed surface of the wall in which the ring is engaged.

7. The assembly of claim 6 wherein the sleeve has a front edge characterized by a flange which flange is adapted to abut the wall in which the ring is engaged.

8. The assembly of claim 1, 2, or 4 wherein the inner surface of the ring is roughened.

9. The assembly of any of claim 1, 2, or 4 wherein the ring has a durometer of between 30 to 90.

10. The assembly of any of claim 1, 2, or 4 wherein the ring has a loss modulus of about $10^{10}$ Dynes/cm$^2$ at 100 to 1000 Hz.

* * * * *